United States Patent
Priyanto et al.

(10) Patent No.: US 11,218,205 B2
(45) Date of Patent: Jan. 4, 2022

(54) MULTI-BEAM OPERATION FOR RANDOM ACCESS TRANSMISSION IN A MOBILE RADIO COMMUNICATION NETWORK

(71) Applicant: Sony Corporation, Tokyo (JP)

(72) Inventors: Basuki Priyanto, Lund (SE); Erik Bengtsson, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/085,280

(22) Filed: Oct. 30, 2020

(65) Prior Publication Data
US 2021/0050894 A1 Feb. 18, 2021

Related U.S. Application Data

(63) Continuation of application No. 16/343,799, filed as application No. PCT/US2017/059898 on Nov. 3, 2017, now Pat. No. 10,855,354.

(Continued)

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC .... H04B 7/0617; H04B 7/088; H04B 7/0695; H04L 5/001; H04W 72/0406; H04W 74/0833
See application file for complete search history.

(56) References Cited

U.S. PATENT DOCUMENTS

2016/0119910 A1* 4/2016 Krzymien ............. H04L 5/0023
  370/329
2016/0345216 A1* 11/2016 Kishiyama ............. H04W 48/12
  (Continued)

FOREIGN PATENT DOCUMENTS

| JP | 2015-164281 A | 9/2015 |
| JP | 2016510197 A | 4/2016 |
| WO | 2016062292 A1 | 4/2016 |

OTHER PUBLICATIONS

International Search Report and Written Opinion from corresponding International Application No. PCT/US2017/059898, dated Feb. 8, 2018; 10 pages.

(Continued)

*Primary Examiner* — Kenneth T Lam
(74) *Attorney, Agent, or Firm* — Tucker Ellis LLP

(57) ABSTRACT

Multi-beam multiplexing in mobile radio communication networks, specifically for initial network access transmissions, such as Random Access Channel (RACH) transmissions and other initial network access signals that affect the operation of the Random Access operation. A network node is configured to distribute, simultaneously, a plurality of beams across a predetermined coverage area. Each of the beams are associated with a different coverage area. In addition, a plurality of sub-carriers are precoded in an OFDM modulated signal, which includes control information, for the purpose of shaping (i.e., beamforming) each of the plurality of beams. In this regard, one or more sub-carriers are mapped to a beam.

14 Claims, 8 Drawing Sheets

Related U.S. Application Data

(60) Provisional application No. 62/417,817, filed on Nov. 4, 2016.

(51) Int. Cl.
*H04L 5/00* (2006.01)
*H04W 72/04* (2009.01)
*H04W 74/08* (2009.01)

(52) U.S. Cl.
CPC ......... *H04L 5/001* (2013.01); *H04W 72/0406* (2013.01); *H04W 74/0833* (2013.01)

(56) References Cited

U.S. PATENT DOCUMENTS

| | | | |
|---|---|---|---|
| 2017/0302335 A1 | 10/2017 | Sawata et al. | |
| 2017/0302355 A1* | 10/2017 | Islam | H04W 72/042 |
| 2018/0083680 A1 | 3/2018 | Guo et al. | |
| 2018/0176065 A1 | 6/2018 | Deng et al. | |
| 2018/0368005 A1 | 12/2018 | Fukui et al. | |
| 2019/0104551 A1 | 4/2019 | Deenoo et al. | |
| 2019/0141752 A1 | 5/2019 | Kim et al. | |

OTHER PUBLICATIONS

"Frame structure support for DL and UL sweeping subframes", Nokia, Alcatel-Lucent Shanghai Bell, Lisban, Portugal, Oct. 2016, R1-1610242, 4 pages.

Office Action from corresponding Japanese Application No. 2019-522964 dated Jan. 5, 2021.

ZTE, "Overview of NR Initial Access", 3rd Generation Partnership Project (3GPP), Aug. 22-26, 2016, Gothenburg, Sweden, R1-166417, pp. 1-6.

ZTE, "Beamformed Random Access in NR", 3rd Generation Partnership Project (3GPP), Aug. 22-26, 2016, Gothenburg, Sweden, R1-166419, pp. 1-8.

ZTE, "Unified Random Access in NR", 3rd Generation Partnership Project (3GPP), Oct. 10-14, 2016, Lisbon, Portugal, R1-1608968, pp. 1-5.

Samsung, "Power Ramping Versus Beam Switching", 3rd Generation Partnership Project (3GPP), Nov. 14-18, 2016, Reno, US, R1-1612467.

\* cited by examiner

MULTI-BEAM OPERATION FOR RANDOM ACCESS TRANSMISSION IN A MOBILE RADIO COMMUNICATION NETWORK

FIELD OF THE INVENTION

In general, embodiments of the invention relate to mobile telecommunications and, more particularly, methods, apparatus, computer program products and the like for multi-beam operation for enabling network access in a radio communication network.

BACKGROUND

In mobile radio communication the usage of multiple antennas for transmission and/or reception can be used for directional signal transmission or reception, otherwise referred to herein as "beamforming". Beamforming may be analog or digital. In digital beamforming each individual antenna in the antenna array has an RF (Radio Frequency) transceiver, which are fed by individual baseband signals. The individual baseband signals contain information of multiple signals, super-positioned, so that, simultaneous multiple beams can be achieved in different directions. The combination of the information contained in the individual baseband signals is performed within the digital domain. In analog beamforming individual physical analog phase shifters are implemented in conjunction with each antenna element either before or after the power allocation in the downlink (i.e., receive path). Thus, in the analog realm beamforming of a single beam is attained based on the relative phase set for each of the individual antennas in the antenna array. Additionally, beamforming may be a hybrid, meaning that directional signal transmission and/or reception can be achieved by a combination of both digital and analog techniques.

There are instances in which beamforming is beneficial to the link budget (i.e., accounting of all gains and losses from the transmitter through the communication medium to the receiver) between two individual nodes in a mobile radio communication network. While in other instances, beamforming is beneficial when multiple nodes are active simultaneously. For example, implementing beamforming for the broadcasting of fundamental system information from base stations (BS, eNBs, gNBs and the like) to multiple active mobile devices/UE (User Equipment).

In certain mobile communication standards, such as 3GPP (3rd Generation Partnership Project), New Radio (NR) or 5G ($5^{th}$ Generation) it is proposed that broadcast signals from the base station are repeated in time, such that different repetitions of the signal are transmitted with different beamforming configurations. In such instances, if the UEs are listening to the different repetitions, the UE can perform a beam sweep to identify which of the different beamforming configurations, transmitted on the downlink over time, result in the best reception/demodulation performance (i.e., which of the beamforming configurations is the strongest so that information can readily be extracted from the modular carrier wave).

Once the UE has identified the best beamforming configuration, the UE may perform a requisite initial access/contact procedure for the purpose of attaching to the network/base station. In specific instances, such as in Long Term Evolution (LTE), the initial access/contact procedure may be a Random Access CHannel (RACH) procedure. The RACH procedure assumes that two or more UEs may be attempting to attach to the network at the same time and, thus, to avoid collisions each UE needs to know at what point in time they should contact the network. The first step of the RACH procedure is for the UE to transmit a RACH preamble sequence to the base station/eNB or gNB. In such instances, the RACH preamble transmission is conducted with a preamble that corresponds to the identified best beamforming configuration. One such method of the corresponding mapping of the preamble to the beamforming configuration is that the UE performs the RACH procedure in an uplink time and/or frequency slot that is mapped to the identified beamforming configuration. The mapping information is informed by the BS to the UE as part of a system information message. Thereafter, the network can be aware of the current best beam configuration for transmission. This is an ideal situation in which, as shown in FIG. 1A, the beams can be matched (i.e., beam alignment) from both the UE and the base station.

However, once the beams are aligned, a need exists to be able to manage the beam so as to maintain beam alignment between the base station and the UE. Further, while the aforementioned mapping of uplink slots to the identified beam configuration provides a viable means for identifying when to perform an initial access/contact procedure, such as a RACH procedure, a need exists to improve upon delays (i.e., latency) introduced in such a time dependent process.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing methods, apparatus, systems or the like for frequency domain multi-beam multiplexing, in accordance with embodiments of the present invention. Specifically, the invention employs a Base Station (BS) or other network node that is configured to distribute, simultaneously, a plurality of beams across a predetermined coverage area. Each of the beams are associated with a precoding and a different coverage area. In addition, the invention includes precoding a plurality of sub-carriers in an Orthogonal Frequency Division Multiplexing (OFDM) modulated signal for the purpose of shaping (i.e., beamforming) each of the plurality of beams. In this regard, each of the different slots available for an initial access/contact procedure, such as a RACH procedure, which are each associated with a different beamforming configuration in the base station, are mapped to the frequency domain as opposed to or in combination with the time domain. As such, the present invention consumes less time resources by allocating different sub-carriers in the frequency domain and, thus, improves latency introduced by the initial access/contact procedure.

Additional embodiments of the invention, in which the different slots available for the synchronization process are mapped to both the frequency and time (i.e., a so called hybrid scenario), provide for beam direction information associated with the initial access/contact procedure resources to be broadcasted from the base station to the UEs so that the UEs are aware of the receiving beam configuration of the base station. In those embodiments in which the initial access/contact procedure is a RACH procedure the beam directional information is associated with RACH frequency and time resources.

In other embodiments of the invention, in which alignment in beam configuration between the BS and UE cannot be assumed and, thus, the different slots available for the initial access process (e.g., RACH resources) are mapped to only the frequency domain, the UE may be configured to send transmissions, such as RACH preamble and the like, in multiple short bursts, such that each burst uses a different beam direction. In response to receiving the short bursts, the BS may measure the received power or other quality parameter(s) related to the received signal of each short burst to identify the relative power or signal quality difference between each short burst. The BS can then report the best beam index/beam identity information back to the UE for the purpose of the UE making necessary adjustments to the transmission beam.

In still further embodiments of the invention, in which the different slots available for the initial access process are mapped to only the frequency domain, retransmission of the initial access transmissions, such as RACH preamble or the like may be performed, with each retransmission using a new beam direction instead of increasing the power. Such retransmission is warranted in the event that the UE does not receive an ACK message also known as a Random Access Response (RAR) from the BS confirming receipt of the transmission.

Hereinafter, we summarize claimed embodiments of the invention as follows. These claimed embodiments of the invention should not be construed as limiting or as the only embodiments of the invention.

A method for enabling network access in a radio communication network defines first embodiments of the invention. The method includes defining a plurality of beams, to cover a predetermined area, such that each beam has a polarization or coverage area different from the other beams. The method additionally includes transmitting, simultaneously in the plurality of beams and over a plurality of sub-carriers, an Orthogonal Frequency-Division Multiplexing (OFDM) modulated signal that includes control information for use in a network access procedure. Each of the plurality of beams is represented by at least one of the sub-carriers comprising the control information. In specific embodiments, the OFDM modulated signal comprises at one of a Random Access Channel (RACH) preamble signal, a pilot signal, a broadcast signal and/or a synchronization signal.

In specific embodiments the method further includes, in response to the transmitting, receiving further control information for use in the network access procedure. The further control information is transmitted in a same beam direction as a beam direction in which the control information is received.

In other specific embodiments of the method, transmitting further includes mapping each of the at least one sub-carriers to one beam of the plurality of beams. In specific related embodiments each of the at least one sub-carrier comprises a pattern repeated over time, while in other embodiments the at least one sub-carrier further comprises a block of sub-carriers comprising a predetermined number of sub-carriers.

In other specific embodiments of the method, the transmitting further comprises transmitting simultaneously in the plurality of beams and over the plurality of sub-carriers the OFDM modulated signal that is configured to include indicate at least one of (i) a beam identifier associated with the corresponding beam and/or (ii) a direction of each of the plurality of beams in reference to predefined resources, such as frequency and/or time.

A network node (i.e., a UE or BS/eNB) defines a further embodiment of the invention. The network node includes a processor and a transceiver in communication with the processor. The transceiver is configured to transmit, simultaneously in a plurality of beams and over a plurality of sub-carriers, an Orthogonal Frequency-Division Multiplexing Signal (OFDM) modulated signal. The OFDM modulated signal includes control information for use in a network access procedure. Each of the plurality of beams is represented by at least one of the sub-carriers comprising the control information and the beams are defined to cover a predetermined area, such that, each beam has a polarization or coverage area that is different from the other beams.

A computer program product for enabling network access in a radio communication network defines still further embodiments of the invention. The computer program product includes a non-transitory computer-readable medium comprising a set of codes. The codes cause a computer to transmit, simultaneously in a plurality of beams and over a plurality of sub-carriers, an Orthogonal Frequency-Division Multiplexing Signal (OFDM) modulated signal. The OFDM signal includes control information for use in a network access procedure. Each of the plurality of beams is represented by at least one of the sub-carriers comprising the control information and the plurality of beams are defined to cover a predetermined area, such that, each beam has a polarization or coverage area that is different from the other beams.

Another method for network access in a radio communication network defines further embodiments of the invention. The method includes receiving, from a network node, control information for use in a network access procedure. The control information is transmitted, simultaneously in a plurality of beams and over a plurality of sub-carriers in an Orthogonal Frequency-Division Multiplexing (OFDM) modulated signal. The method further includes determining a beam direction used for transmitting the received control information based on one or more sub-carriers comprising the control information.

In specific embodiments of the method, the beam direction is determined based on a pre-defined mapping of one or more sub-carriers to beam directions for each of the plurality of beams in reference to predefined resources. In such embodiments the method may further include, prior to receiving the control information, receiving pre-defined mapping of one or more of the plurality of sub-carriers to a beam direction for each of the plurality of beams.

In other specific embodiments the method includes, in response to determining the beam direction, transmitting, to the network node, further control information that indicates the determined beam direction and/or is transmitted in a same beam direction as the determined beam direction. In specific related embodiments of the method, the further control information is transmitted in a plurality of short burst transmissions. Each short burst transmission is associated with at least one of the sub-carriers within the OFDM modulated signal. In such embodiments, in the event that the network node fails to receive the short burst transmissions, the method includes re-transmitting the further control information using a different beam direction while maintaining a same transmit power.

In other related embodiments of the method, the network node that receives the short burst transmissions, measures a power of each short burst transmission, identifies a short burst transmission with a strongest power and transmits the beam identity information associated with the identified short burst transmission. In such embodiments the method may further include receiving, from the network node, the beam identity information and using the beam identity information to select a beam direction for further transmissions.

A network node (i.e., UE or BS/eNB) defines further embodiments of the invention. The network node includes a processor and a transceiver in communication with the processor. The transceiver is configured to receive, from a network node, control information for use in a network access procedure. The control information is transmitted, from the network node, simultaneously in a plurality of beams and over a plurality of sub-carriers, in an Orthogonal Frequency-Division Multiplexing (OFDM) modulated signal. The processor is configured to determine a beam direction used for transmitting the received control information based on one or more sub-carriers comprising the control information.

A computer program product for enabling network access in a radio communication network defines further embodiments of the invention. The computer program product includes a non-transitory computer-readable medium comprising a set of codes. The set of codes cause a computer to, in response to receiving, from a network node, control information for use in a network access procedure, determine a beam direction used for transmitting the received control information based on one or more sub-carriers comprising the control information. The control information is transmitted, from the network node, simultaneously in a plurality of beams and over a plurality of sub-carriers in an Orthogonal Frequency-Division Multiplexing (OFDM) modulated signal.

Thus, systems, apparatus, methods, and computer program products herein described in detail below provide for frequency domain multi-beam multiplexing. In this regard, the invention employs a Base Station (BS) that is configured to distribute, simultaneously, a plurality of beams across a predetermined coverage area. Each of the beams are associated with a precoding and a different coverage area. In addition, the invention includes precoding a plurality of sub-carriers in an OFDM modulated signal for the purpose of shaping (i.e., beamforming) each of the plurality of beams. In this regard, each of the different slots available for an initial access/contact procedure, such as a RACH procedure, which are each associated with a different beamforming configuration in the base station, are mapped to the frequency domain as opposed to or in combination with the time domain. As such, the present invention consumes less time resources by allocating different sub-carriers in the frequency domain and, thus, improves latency introduced by the initial access/contact procedure.

BRIEF DESCRIPTION OF THE DRAWINGS

Figure 1:
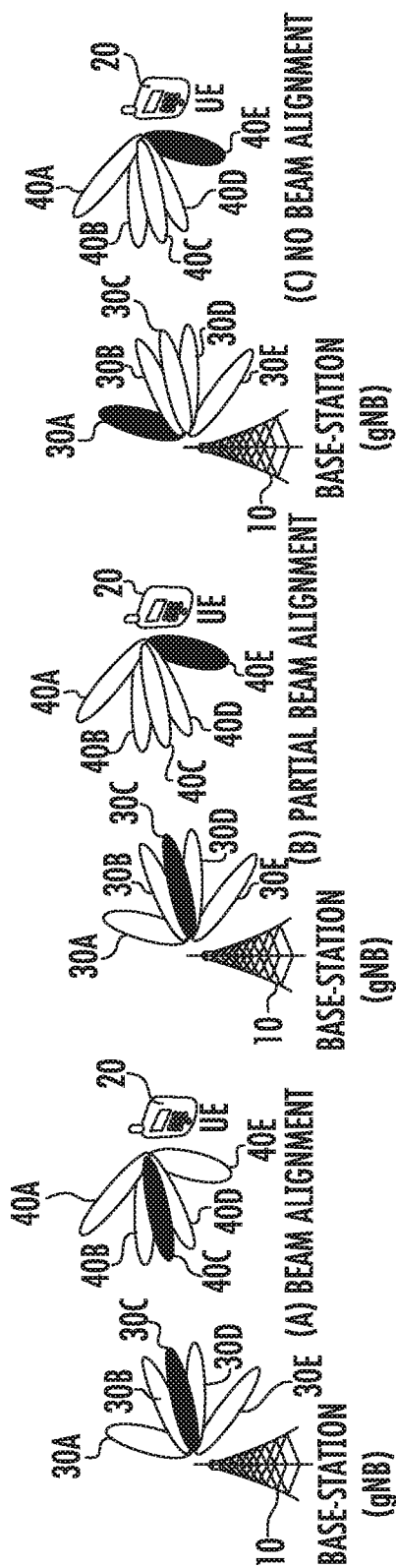
Figure 2:
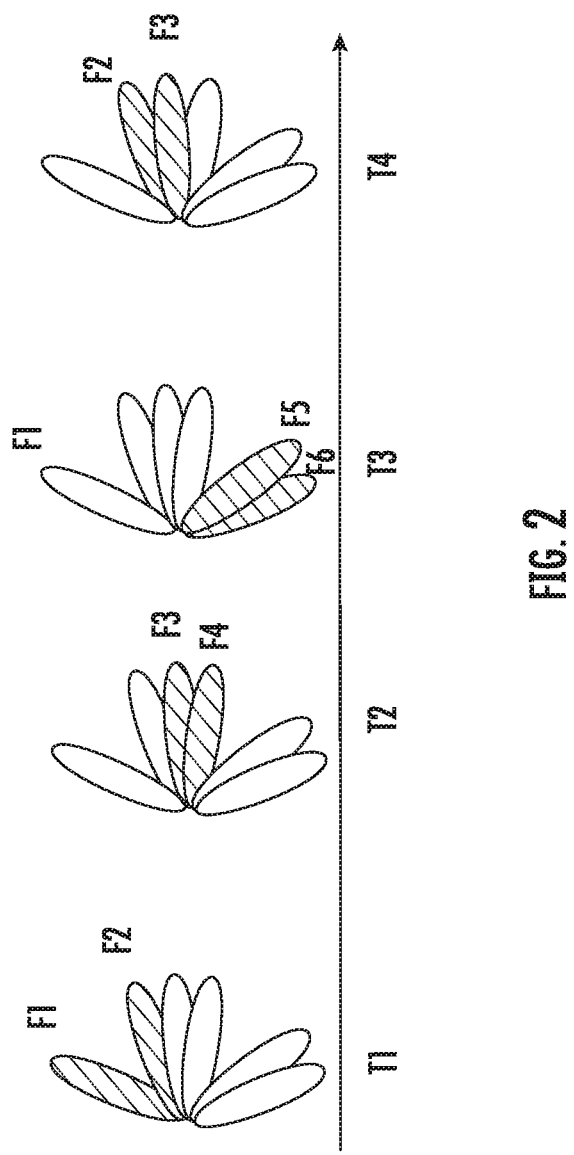
Figure 3:
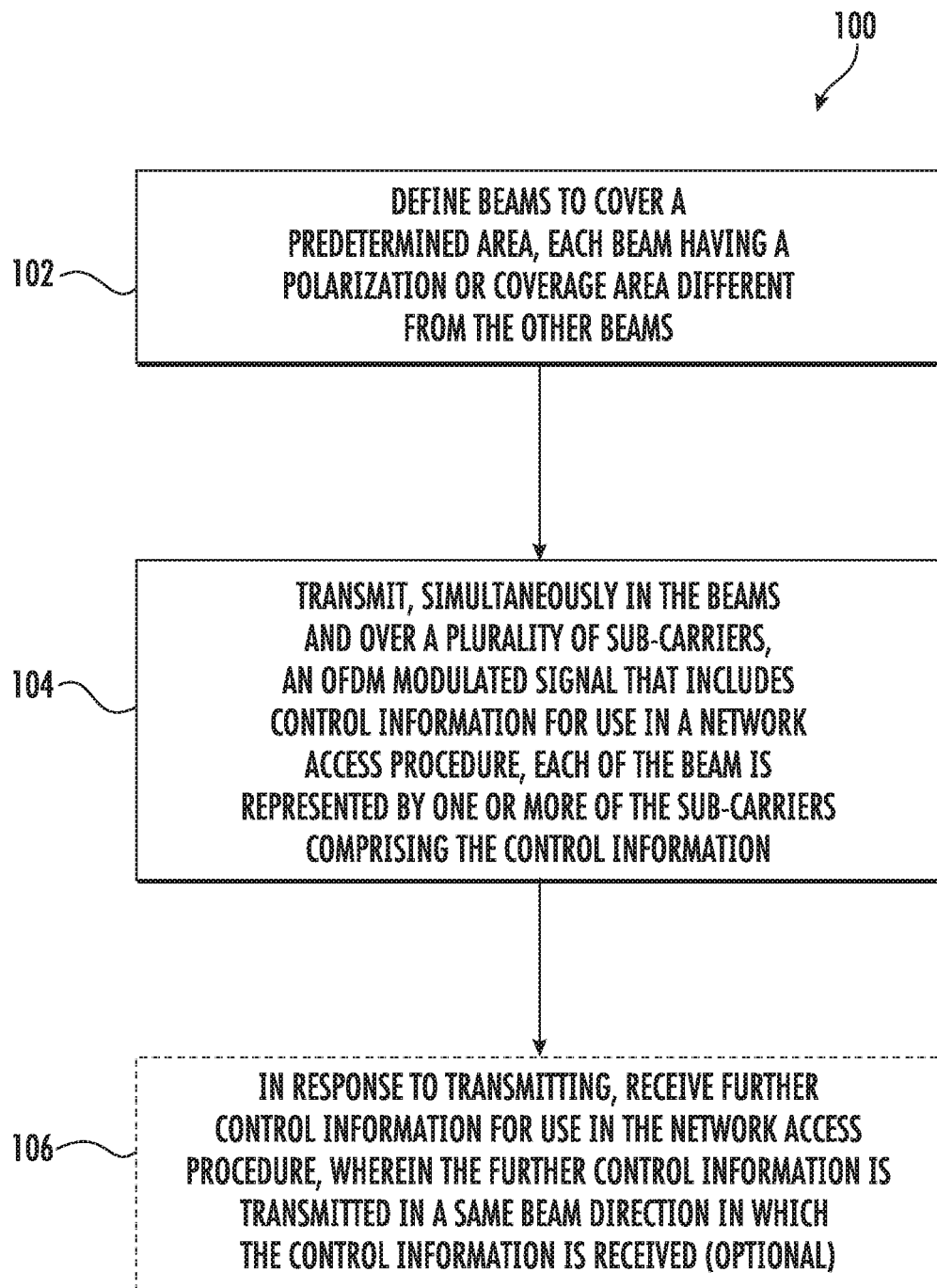
Figure 4:
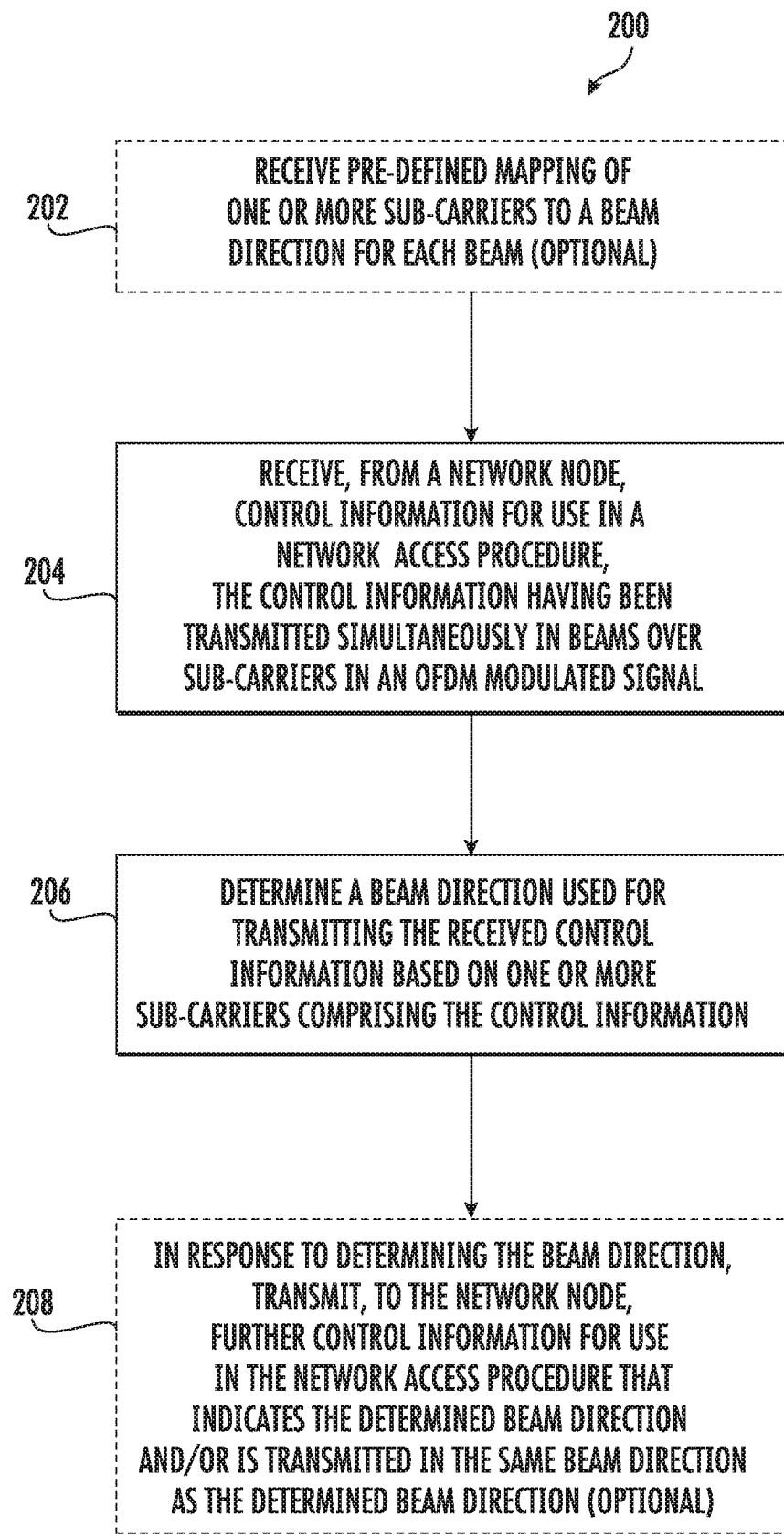
Figure 5:
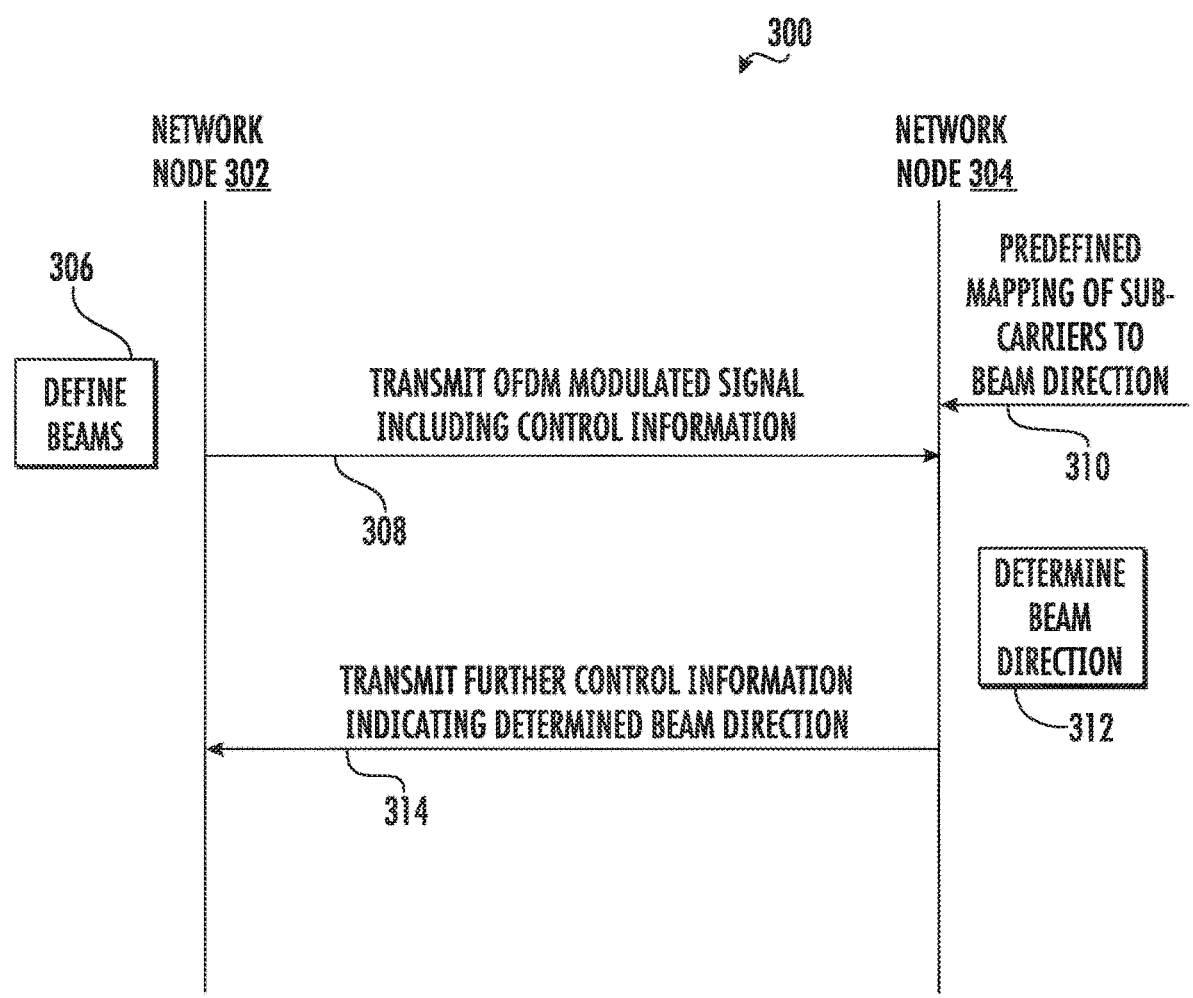
Figure 6:
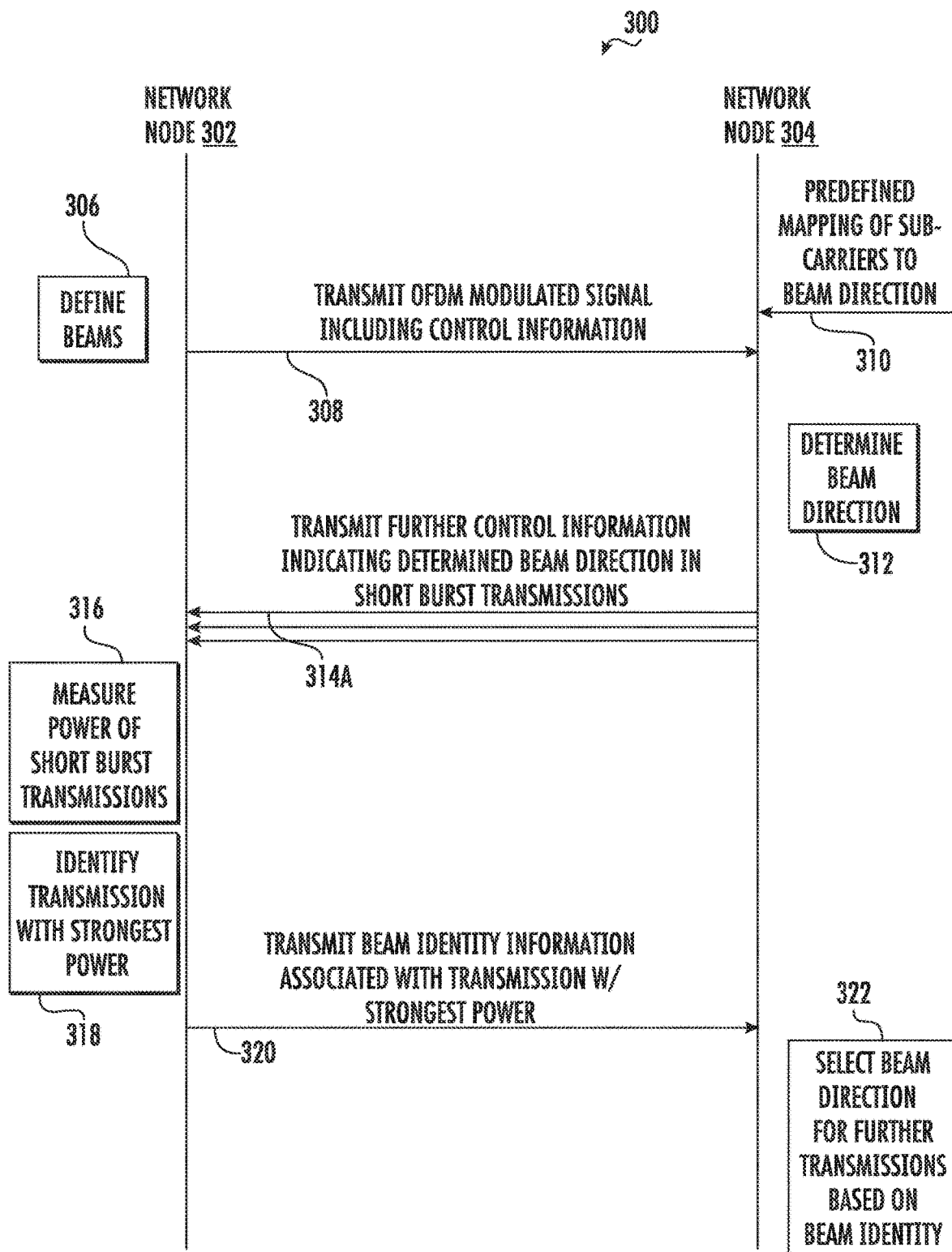
Figure 7:
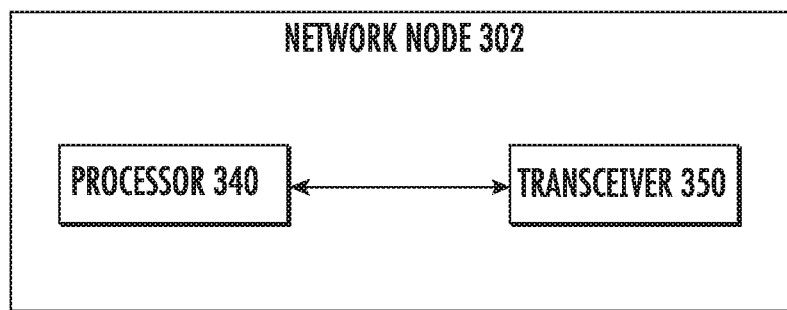
Figure 8:
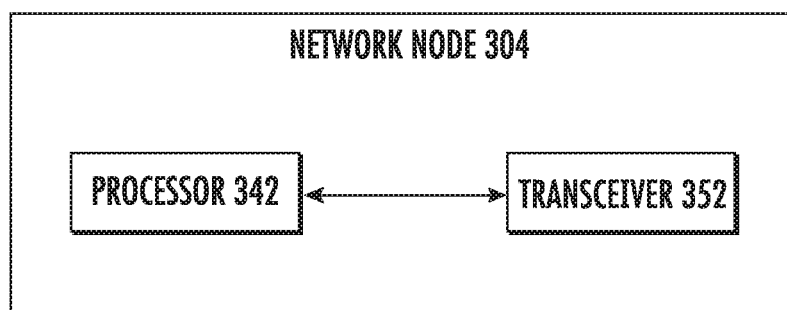
Figure 9:
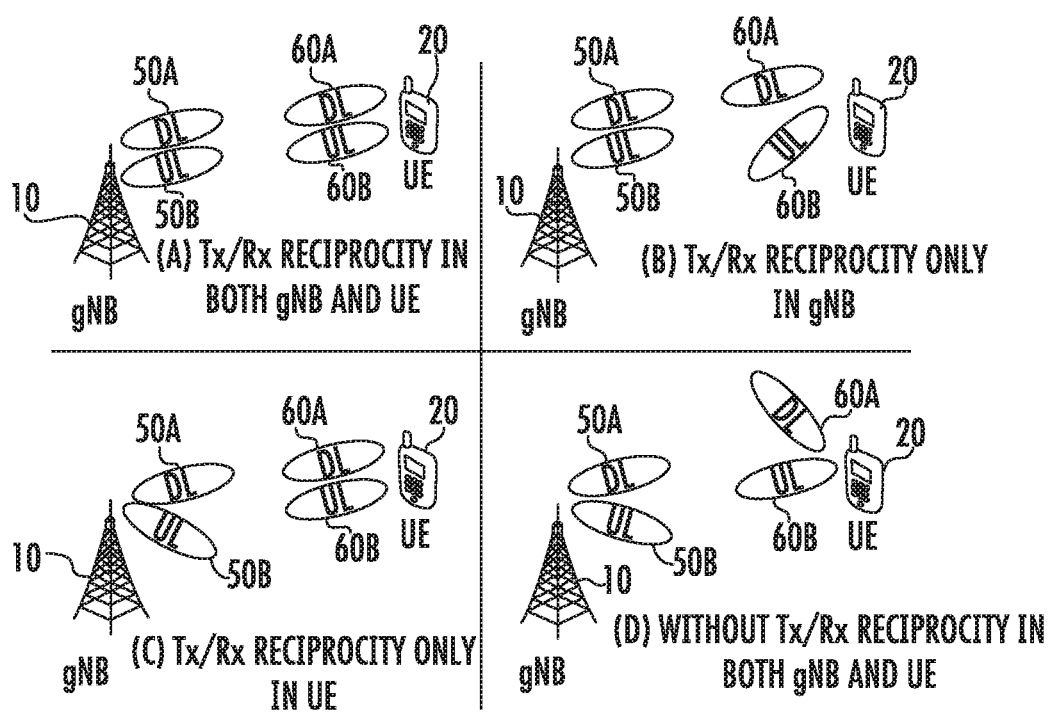

Having thus described embodiments of the invention in general terms, reference will now be made to the accompanying drawings, where:

FIGS. 1A-1C are schematic diagrams of three different beam alignments in a multi-beam transmission environment of a mobile communication network, in accordance with embodiments of the present invention;

FIG. 2 is a schematic diagram of beam multiplexing in both frequency and time domains, in accordance with embodiments of the present invention;

FIG. 3 is a flow diagram of a method for enabling network access in a radio communication network, in accordance with embodiments of the present invention;

FIG. 4 is a flow diagram of another method for enabling network access in a radio communication network, in accordance with embodiments of the present invention;

FIG. 5 is a signaling diagram for enabling network access in a radio communication network, in accordance with embodiments of the present invention;

FIG. 6 is another signaling diagram for enabling network access in a radio communication network, in accordance with embodiments of the present invention;

FIG. 7 is a block diagram of a network node for enabling network access in a radio communication network, in accordance with embodiments of the present invention;

FIG. 8 is a another block diagram of another network node for enabling network access in a radio communication network, in accordance with embodiments of the present invention; and FIG. 9 is a schematic diagram illustrating four different scenarios for Tx/Rx reciprocity, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A mobile device may be referred to as a node or user equipment ("UE"). For the purpose of sending or receiving data, the device may connect to a wireless local area network ("WLAN") or a mobile communication network (including evolution of 3GPP) LTE releases and 5$^{th}$ Generation ("5G") New Radio (NR) releases). Any network described herein may have one or more base stations ("BS"), otherwise referred to as an eNodeB (eNB), gNodeB (gNB) and/or access points ("AP").

As discussed in detail herein, the present invention provides for frequency domain multi-beam multiplexing in initial access transmissions, such as Random Access Channel (RACH) transmissions and the like, in accordance with embodiments of the present invention. Specifically, a Base Station (BS) or other network node is configured to distribute, simultaneously, a plurality of beams across a predetermined coverage area. Simultaneous distribution of the beams provides for the beams to be distributed completely or at least partially overlapping in time. Each of the beams are associated with a precoding and a different coverage area. In addition, the invention includes precoding a plurality of sub-carriers in an Orthogonal Frequency Division Multiplexing (OFDM) modulated signal for the purpose of shaping (i.e., beamforming) each of the plurality of beams. In this regard, each of the different slots available for an initial access/contact procedure, such as a RACH procedure, which are each associated with a different beamforming configuration in the base station, are mapped to the frequency domain as opposed to or in combination with the time domain. As such, the present invention consumes less time resources by allocating different sub-carriers in the frequency domain and, thus, improves latency introduced by the initial access/contact procedure.

Referring to FIGS. 1A-1C, three different beam alignments are depicted for multi-beam multiplexing, in accordance with embodiments of the present invention. The Base Station (BS) 10, otherwise referred to as an e-NodeB (eNB), g-NodeB (gNB), access point or the like, includes multiple antenna with each antenna configuration (by precoding or phase and amplitude modulation) having an associated beam 30A-30E that transmits and receives signals in a specified direction. Likewise, the User Equipment (UE) 20, otherwise referred to as a terminal, mobile device or the like includes multiple antenna with each antenna configuration (by precoding or phase and amplitude modulation) having an associated beam 40A-40E which transmit and receive signals in a specified direction. It should be noted that while FIGS. 1A-1C show five beams 30A-30E, 40A-40A emanating from BS 10 and UE 20, in practice, the BS 10 and UE 20 will have many more antenna, and thus many more beams emanating therefrom. FIG. 1A is illustrative of an instance in which the beamforming configuration (i.e., the beam(s) that are operative for transmission/reception between the BS 10 and UE 20) of the BS 10 and UE 20 are matched, otherwise referred to as full beam alignment. In the illustrated example of FIG. 1A, full beam alignment is shown by beams 30C and 40C, which are generally directed toward each other, being the operative beams for transmission and/or reception of signals. The full beam alignment shown in FIG. 1A is indicative of Time Division Duplex (TDD) multiplexing, since an assumption can be made that full beam alignment is characteristic of TDD multiplexing. As previously discussed, in one example of TDD multiplexing, once the UE 20 identifies which of the different beamforming configurations result in the best demodulation performance (i.e., the best signal-to-noise ratio), the Random Access Channel (RACH) preamble transmission is performed with a preamble that corresponds to the identified best beamforming configuration. The UE 20 does the RACH procedure in a corresponding uplink time or frequency slot that is mapped to the same beamforming configuration and, thereafter, the network (i.e., BS 10) is made aware of the current best beam for transmission and matches beamforming configurations to that of the UE 20 (i.e., uplink transmissions from the UE 20 to the BS 10 will be in the same direction since both the BS 10 and the UE 20 use the same frequency). Thus, in most instances, TDD multiplexing results in full beam alignment.

FIGS. 1B and 1C are illustrative of instances in which the beamform configuration (i.e., the beam(s) that are operative for transmission/reception between the BS 10 and UE 20) of the BS 10 and UE 20 are less than full beam alignment. In the illustrated example of FIG. 1B, partial beam alignment is shown by beams 30C and 40E, which are only partially aligned in direction, being the operative beams for transmission and/or reception of signals. While in FIG. 1C, no beam alignment exists since beams 30A and 40E, which are not aligned in direction, are the operative beams for transmission and/or reception of signals. Such partial alignment and/or no alignment may be present in Long-Term Evolution (LTE) or 5G networks using multi-beam transmissions during contact procedures, such as RACH procedure or the like. In the present invention, in which frequency domain multi-beam multiplexing is implemented, less than partial or no beam alignment may be apparent and needs to be addressed. This is because Frequency Division Duplex (FDD) multiplexing uses a paired frequency band for uplink and, as such, when the UE 20 transmits on the uplink the UE 20 does not know whether to use the same phase offsets to the antenna and, thus is not certain that transmission will reach the BS 10 since the frequencies implemented by the BS 10 and UE 20 are different. Thus, in order to improve latency and insure that uplink transmissions are received by the BS 10, the present invention serves to manage the beamforming configurations to result in or maintain full beam alignment between the BS 10 and the UE 20.

According to embodiments of the present invention, frequency domain multi-beam multiplexing is achieved by precoding a plurality of sub-carriers in an Orthogonal Frequency-Division Multiplexing (OFDM) modulated signal in order to shape (i.e., beamform) each of the beams distributed by a multi-beam BS. In this regard, according to specific embodiments of the invention, different slots of an initial access/contact signal, in which the BS antenna configurations are used, are mapped to the frequency domain as opposed to or in combination with the time domain. In this manner the initial access/contact transmissions between BSs and UEs will consume less time resources and, instead, be allocated different sub-carriers in the frequency range.

It should be noted that the frequency domain multi-beam multiplexing discussed herein is not limited to any one initial access/contacting signaling procedures, such as RACH procedure, but is also applicable to other pilots and/or reference signals that are typically transmitted over larger bandwidths.

According to specific embodiments of the invention, in which beamforming is limited to digital beamforming (D-BF), since each sub-carrier could have different beamforming, the different sub-carriers may be pre-coded for different beams in different directions. In this regard, the different precoding vectors are simultaneously capable of covering all the sub-carriers. The BS only sees those sub-carriers that are directed in the direction of the UE. This is because in D-BF, the UE simultaneously listens in multiple directions, signals are received across all antenna and the signals are processed, in the digital domain, to determine the combination of signals that results in the strongest signal-to-noise ratio.

In other specific embodiments of the invention, in which both TDD and FDD are employed, referred to herein as hybrid beamforming (H-BF), both digital beamforming (D-BF) and analog beamforming (A-BF) may be implemented. In H-BF, phase shifters are employed on the signals to the antennas in addition to digital beamforming. In the analog portion, the phase shifters are physically changed to direct the antenna in different directions, one direction at a time. A-BF can be designed to define a number of sectors (i.e., portions of the total coverage area of the BS, which are less than the total coverage area), in which each sector is addressed by D-BF to address different sub-sectors for the different sub carriers. For example, the analog portion of the beamforming may be directed to one sector of the cell. D-BF is then performed in that sector, followed sequentially by D-BF in the other sectors. Thus, within each sector of a cell, transmission occurs in different pre-coded vectors for different sub-carriers. Thus, in this instance, time multiplexing is required so that each sector is time multiplexed, while within each sector D-BF is implemented, so that each sector is also frequency multiplexed.

Referring to FIG. 2, shown is an example of beam multiplexing in both frequency and time domains. In accordance with embodiments of the present invention, frequency domain multiplexing is in combination with time domain multiplexing (i.e., hybrid beamforming (H-BF)), depending on resource availability at the BS and/or UE. For example, certain UEs may only operate in limited bandwidth and, as such, time multiplexing may be needed in addition to frequency domain multiplexing. In such instances the beamforming for the different sub-carriers are not fixed over time, but are altered periodically and/or randomly. In the embodiment shown in FIG. 2, at a first time (T1), beams corresponding to a first beamforming configuration (F1) and a second beamforming configuration (F2) are covered simultaneously with digital beamforming (D-BF). At a second time (T2), a shift to analog beamforming (A-BF) results in beams corresponding to a third beamforming configuration (F3) and a fourth beamforming configuration (F4) being covered. At a third time (T3), either a shift to D-BF occurs or the A-BF continues and beams corresponding to a fifth beamforming configuration (F5) and a sixth beamforming configuration (F6) are covered. Further, at a fourth time (T4), either with D-BF or A-BF, beams corresponding to the second beamforming configuration (F2) and third beamforming configuration (F3) are covered.

Referring to FIG. 3, a flow diagram is presented of a method 100 for enabling network access in a radio communication network, in accordance with embodiments of the present invention. At step 102, a plurality of beams are defined to cover a predetermined area. Each of the beams has a polarization or coverage area within the predetermined area that is different from the other beams.

At step 104, an Orthogonal Frequency-Division Multiplexing (OFDM) modulated signal is transmitted, by a network node (e.g., UE, BS or the like), simultaneously in the plurality of beams and over a plurality of sub-carriers. As previously discussed, simultaneous transmission within the plurality of beams provides for the transmissions to occur completely or at least partially overlapping in time. The OFDM modulated signal comprises control information for use in a network access procedure. Each of the plurality of beams is represented by at least one of the sub-carriers comprising the control information. A network access procedure, as used herein, is the control signaling message interchange between two nodes (e.g., UE and network entity, such as, BS, eNB, AP or the like) for the purpose of initiating and configuring a data transfer between the UE and network or network and UE. Such, control signaling typically includes a series of messages being communicated between the UE and the network entity. Further, the network access procedure may provide for a transition from an idle/inactive state/mode to a connected/active state/mode In specific embodiments of the method, the OFDM modulated signal that includes the control information is a control signal, e.g., one or more of a pilot signal, Random Access Channel (RACH) preamble signal, synchronization signal, broadcast signal or any other control signal. Control information is any non-application layer data included in control signaling that is transmitted over control channels (as opposed to data channels). Further, control information is defined as information intended to support the wireless protocol operation and configuration and can be transmitted as broadcasted communication or dedicated (i.e., one or more specified recipients) communication. The control information may include, but is not limited to, one or more of (i) a beam identifier associated with a corresponding beam, (ii) a cell identifier, (iii) a node identifier, such as a UE or BS identifier or the like. In other specific embodiments of the method, the OFDM modulated signal is configured to indicate a direction of each of the beams in reference to predefined resources. In those embodiments of the method in which the OFDM modulated signal is a RACH preamble signal, the predefined resources include frequency and time.

The network node (e.g., UE) that transmits the OFDM modulated signal is made aware of the predefined resources (e.g., frequency and/or time) through receipt of a network broadcasted signal that maps the RACH resource and synchronization signal.

In specific embodiments of the method, transmitting the OFDM modulated signal that includes the control information further comprises mapping each of one or more sub-carriers to one of the beams. In such embodiments of the method, each of the one or more sub-carriers comprise a pattern that is repeated over time, such as a synchronization signal or multiple RACH preamble signals. In other such embodiments of the method, one or more sub-carriers comprises a block of sub-carriers that includes a predetermined number of sub-carriers.

At optional step 106, in response to transmitting the OFDM modulated signal that includes the control information, further control information is received at the network node for use in the network access procedure. The further control information is transmitted by another network node (i.e., UE, BS or the like) that has received the OFDM modulated signal and is transmitted based on the beam direction in which the other network node received the control information. In specific embodiments of the method, in which the OFDM modulated signal is a synchronization signal, the signal that includes the further control information may be a RACH preamble signal and may include a node identifier. In other specific embodiments of the method, in which the OFDM modulated signal is a RACH preamble, the signal that includes the further control information may be a Random Access Response (RAR) message transmitted by a BS/eNB or the like.

Referring to FIG. 4, a flow diagram is presented of a method 200 for enabling network access in a radio communication network, in accordance with embodiments of the present invention. At step 204, a network node (i.e., UE or BS/eNB) receives the control information described in relation to FIG. 3 and for use in the network access procedure. As previously discussed in relation to FIG. 3, the control information is transmitted, from a network node, simultaneously in beams and over sub-carriers, in an OFDM modulated signal.

At step 206, in response to receiving the control information, the network node determines the beam direction that was used for transmitting the received control information based on one or more sub-carriers comprising the control information. In specific embodiments of the method, the determination of the beam direction is based on a predefined mapping of one or more sub-carriers to beam directions for each of the beams in reference to predefined resources. In such embodiments the method may include optional step 202, in which the network node receives the pre-defined mapping of the one or more sub-carriers to the beam directions for each of beams.

At optional step 208, in response to determining the beam direction, the network transmits further control information (to the network node that transmitted the control information) that indicates the determined beam direction. In specific embodiments of the method, the further control information is transmitted in a same beam direction as the determined beam direction. In other specific embodiments of the method, the further control information is transmitted in a plurality of short burst transmissions, such that, each short burst transmission is associated with at least one of the sub-carriers within the OFDM signal. In specific embodiments of the method, in the event that the network node fails to receive the short burst transmissions, the further control information is re-transmitted using a different beam direction while maintaining the same transmit power.

In related embodiments of the method, the network node that receives the short burst transmissions measures the power of each short burst transmission, identifies the short burst transmission with the strongest power and, in response, transmits beam identity information associated with the identified short burst transmission. In further related embodiments of the method, the beam identity information is received from the network node and used to select a beam direction for subsequent transmissions.

Referring to FIG. 5 a signaling diagram 300 is provided for enabling network access in a radio communication network, in accordance with embodiments of the present invention. Network access enabled between network node 302 and network node 304, which may comprise UE or BS/eNB. At process 306, network node 302 defines a plurality of beams to cover a predetermined area. Each of the beams has a polarization or coverage area within the predetermined area that is different from the other beams.

Network node 302 transmits an Orthogonal Frequency-Division Multiplexing (OFDM) modulated signal 308, which is transmitted simultaneously in the plurality of beams and over a plurality of sub-carriers. The OFDM modulated signal 308 comprises control information for use in a network access procedure. Each of the plurality of beams is represented by at least one of the sub-carriers comprising the control information.

In specific embodiments of the invention, the OFDM modulated signal 308 that includes the control information is a control signal, e.g., one or more of a pilot signal, Random Access Channel (RACH) preamble signal, synchronization signal, broadcast signal or any other control signal. The control information may include, but is not limited to, one or more of (i) a beam identifier associated with a corresponding beam, (ii) a cell identifier, (iii) a node identifier, such as a UE or BS identifier or the like. In other specific embodiments of the invention, the OFDM modulated signal 308 is configured to indicate a direction of each of the beams in reference to predefined resources. In those embodiments of the invention in which the OFDM modulated signal 308 is a RACH preamble signal, the predefined resources include frequency and time. In such embodiments of the invention, the network node 302 is made aware of the predefined resources (e.g., frequency and/or time) through receipt of a network broadcasted signal that maps the RACH resource and synchronization signal.

Network node 304 receives the OFDM modulated signal 308 and, in response, determines the beam direction 312 that was used for transmitting the received OFDM modulated signal 308 based on one or more sub-carriers comprising the control information. In specific embodiments of the invention, the determination of the beam direction 312 is based on a predefined mapping of one or more sub-carriers to beam directions for each of the beams in reference to predefined resources. In such embodiments of the invention the network node 304 receives, from a network entity (not shown in FIG. 5) a signal 310 that includes the pre-defined mapping of the one or more sub-carriers to the beam directions for each of beams.

In response to determining the beam direction 312, network node 312 transmits a signal 314 that includes further control information indicating the determined beam direction. In specific embodiments of the invention, the signal 314 including the further control information is transmitted based on the determined beam direction.

Referring to FIG. 6, a signaling diagram 300 is provided for enabling network access in a radio communication network, in accordance with embodiments of the present invention. In the embodiments described in relation to FIG. 6, the signaling 314A that transmits the further control information is a plurality of short burst transmissions, such that, each short burst transmission is associated with at least one of the sub-carriers within the OFDM signal. In specific embodiments of the invention, in the event that the network node fails to receive the short burst transmissions, the further control information is re-transmitted (i.e., further short burst transmissions) using a different beam direction while maintaining the same transmit power.

In response to network node 302 receiving the signals 314, network node 302 measures the power 316 of each short burst transmission/signal and identifies the short burst transmission/signal with the strongest power 318. In response to identifying the short burst transmission/signal with the strongest power 318, network node 302 transmits a signal 310 including beam identity information associated with the identified short burst transmission. In response to network node 304 receiving the signal 318 including the beam identity information, network node 304 select a beam direction 320 for subsequent transmissions based on the beam identity information.

Referring to FIG. 7 a block diagram is provided of a network node 302, in accordance with embodiments of the present invention. As previously discussed, network 302 may comprise UE, BS, eNB, AP or the like. Network node 302 includes at least one processor 340, which is in communication with transceiver 350. Transceiver 350 is configured to transmit, simultaneously in a plurality of beams and over a plurality of sub-carriers, an Orthogonal Frequency-Division Multiplexing Signal (OFDM) modulated signal. The OFDM modulated signal may be any control signal, including, but not limited to, at least one of a Random Access Channel (RACH) preamble signal, a pilot signal, a broadcast signal and a synchronization signal. The OFDM modulated signal includes control information for use in a network access procedure. The control information may include, but is not limited to, a beam identifier associated with the corresponding beam on which the signal is transmitted, a network node identifier, a cell identifier and the like. Each of the plurality of beams is represented by at least one of the sub-carriers comprising the control information. The plurality of beams are defined to cover a predetermined area and each beam has a polarization or coverage area that is different from the other beams.

In response to transmitting the OFDM modulated signal, transceiver 350 is configured to receive further control information for use in the network access procedure. The further control information is transmitted from network node 304 (FIG. 8) based on the beam direction in which the control information is received.

In specific embodiments of the invention, the transceiver 350 is configured to transmit the OFDM modulated signal based on a mapping of each of the at least one sub-carriers to one beam of the plurality of beams. In such embodiments of the invention, each of the at least one sub-carrier comprises a pattern repeated over time. In further related embodiments of the invention, the at least one sub-carrier further comprises a block of sub-carriers comprising a predetermined number of sub-carriers. In other specific embodiments of the invention, the OFDM modulated signal may be configured to indicate a direction of each of the plurality of beams in reference to predefined resources, including at least frequency and time.

Referring to FIG. 8 a block diagram is provided of a network node 304, in accordance with embodiments of the present invention. As previously discussed, network 304 may comprise UE, BS, eNB, AP or the like. Network node 304 includes at least one processor 342, which is in communication with transceiver 352. Transceiver 352 is configured to receive, from network node 302 (FIG. 7), control information for use in a network access procedure, As previously discussed, the control information is transmitted, from the network node, simultaneously in a plurality of beams and over a plurality of sub-carriers in an Orthogonal Frequency-Division Multiplexing (OFDM) modulated signal. Processor 342 is configured to determine a beam direction used for transmitting the received control information based on one or more sub-carriers comprising the control information.

In specific embodiments of the invention, processor 342 determines the beam direction used for transmitting the received control information based on a pre-defined mapping of one or more sub-carriers to beam directions for each of the plurality of beams in reference to predefined resources, including at least time and frequency. In such embodiments of the invention, transceiver 352 is further configured to receive, from network node 302 (FIG. 7) or another network entity, pre-defined mapping of one or more of the plurality of sub-carriers to a beam direction for each of the plurality of beams.

In other specific embodiments of the invention, in response to processor 342 determining the beam direction, transceiver 352 is further configured to transmit, to the network node 302 (FIG. 7), further control information that indicates the determined beam direction. The further control information may be transmitted in a same beam direction as the determined beam direction or based on the determined beam direction.

In specific embodiments of the invention, transceiver 352 is configured to transmit the further control information in a plurality of short burst transmissions, such that each short burst transmission is associated with at least one of the sub-carriers within the OFDM modulated signal. In such embodiments of the invention, processor 340 of network node 302 (FIG. 7) is configured to measure a power of each short burst transmission, identify a short burst transmission with a strongest power and transmit, to network node 304, the beam identity information associated with the identified short burst transmission. In such embodiments of the invention, in response to transceiver 352 receiving, from network node 302 (FIG. 7), the beam identity information, processor 342 is configured to use the beam identity information to select (322) a beam direction for further transmissions.

Referring to FIG. 9 active beam scenarios are depicted, in accordance with embodiments of the present invention. As previously discussed multiple-beam operation is possible in both the UE and network entity (BS, eNB, gNB, AP or the like). As shown in the upper left-hand corner configuration (denoted as (A)) transmission/reception (Tx/Rx) reciprocity (i.e., full beam alignment) can be achieved between gNB 10 and UE 20 when the active beams 50A,B and 60A,B are facing towards each other (i.e., aligned). In other instances, under sub-optimal conditions, less than full beam alignment/reciprocity is achieved. For example, in the upper right-hand corner configuration (denoted as (B)) Tx/Rx reciprocity is achieved only in the gNB 10 and in the bottom left-hand corner configuration (denoted as (C)) Tx/Rx reciprocity is achieved only in the UE 20. In the scenario shown in the bottom right-hand corner (denoted as (D)) not Tx/Rx reciprocity exits for either the gNB 10 or the UE 20. In such instances in which one of the gNB 10 or UE 20 does not have Tx/Rx reciprocity the system strives to have beam alignment for its transmissions. As previously discussed in TDD mode Tx/Rx reciprocity exists for both gNB 10 and UE 20, while in FDD mode, Tx/Rx reciprocity may exists for either gNB 10 and/or UE 20. Specifically, in FDD mode, for a relatively small duplex distance, Tx/Rx reciprocity can be assumed.

In order to maintain beam alignment during control signaling (e.g., RACH preamble transmission or the like) the UE 20 needs to know when the optimal gNB 10 beam is directed to the UE 20 and needs to apply the optimal uplink Tx beam for the transmission. If the gNB 10 is equipped with digital beam forming it is possible for the gNB to simultaneously transmit multiple beams and, in doing so, obtain an instant beam sweep. The different beams being transmitted simultaneously can be precoded with sub-carrier granularity. In comparison to a beam sweep over time, beam sweep over frequency enable a significant improvement in latency.

For the scenario shown in (A), when the UE 20 operates in random access channel (RACH) procedure, the UE has previously performed several initial processes, such as synchronization, acquisition of broadcast signal and system information. As such, the UE 20 is assumed to have knowledge regarding the degree of beam alignment with the gNB 10.

An identifier, such as a beam identifier, can be applied to the beams either from the gNB 10 or the UE 20. To assist the UE 20 is acquiring knowledge of the gNB 10 reception (Rx) beams for use in the RACH preamble transmission, the gNB 10 Rx beam identifier information is broadcasted to the UE 20 and it is associated with the random access resources for preamble transmission. In this regard, the beam identifier information may be part of the New Radio (NR) RACH configuration information (i.e., included in system information).

In those instances in which a mapping exists between gNB 10 Tx/Rx beams and RACH resources (e.g., frequency and time), the mapping information can be part of the RACH configuration information in the system information. Thus, even if there is a Tx/Rx reciprocity, both the gNB 10 and the UE 20 need to update the beam alignment, especially after the idle mode operation. As such, prior to the RACH preamble transmission, the UE 20 performs beam measurements to identify the optimal UE 20 transmission (Tx) beam and the associated gNB 10 reception (Rx) beam. In specific embodiments of the invention, the beam measurements are performed in the downlink reception by utilizing the periodic transmission of NR synchronization signals and/or other broadcast signals. This beam measurement operation is performed when the beams for these signals (synchronization, broadcast and preamble transmission) use the same beam pattern. Thus, the multiple beams of these signals are associated to each other. After the beam measurement operation is performed, UE 20 knows the optimal gNB 10 RX beam and the UE Tx beam, in other words, beam alignment is obtained. Once the UE 20 needs to transmit the RACH preamble, the UE 20 waits until random access resources for the optimal gNB 10 Rx beam are scheduled.

For the partial Tx/Rx reciprocity scenario shown in (B) or (C), the UE 20 can perform beam measurements to identify the optimal UE 20 Tx beam and the associated gNB 10 Rx beam and the beam measurements can be based on NR synchronization signals and/or other broadcast signals. In other embodiments, the multiple beams of the synchronization signal, the broadcast signal and the RACH transmissions can be associated.

The beam identifier information of the multiple beams is broadcasted by the gNB 10 and can be reused for the beam-sweeping purpose (i.e., beam measurements). The UE 20 transmits this beam identifier back to the gNB 10 as part of the RAACH preamble, thus, enabling the gNB 10 to be made aware of both Rx and Tx beams for the specific UE 20.

Multiple beam transmissions downlink broadcast signals (e.g., synchronization, signals, broadcast channel signals and the like) that are periodically transmitted by gNB 10 can be used for beam measurement purposes so that the gNB 10 Tx beam and the UE 20 Rx beam alignment can be obtained (i.e., prior to RACH preamble transmission). The results of the beam measurement process are used as the initial operation for beam alignment.

In the case of gNB 10 Tx/Rx reciprocity, the gNB 10 Rx beam follows the gNB 10 Tx beam. The optimal UE 20 Rx beam is identified by performing UE 20 Rx beam sweeping together with the gNB 10 beam sweeping operation. In the case of UE 20 Tx/Rx reciprocity, the UE 20 Tx beam follows the UE 20 Rx beam. The optimal gNB 10 Rx beam can be identified by performing gNB 10 Rx beam sweeping together with UE 20 Tx beam sweeping.

For the no Tx/Rx reciprocity scenario shown in (D), the Tx beam assistance in the RACH procedure is enabled by performing the beam measurement in the receiver side and reporting back to the transmitted side to refine the Tx beam. In such scenarios the beam alignment aid between the gNB 10 and the UE 20 is needed for transmissions for both uplink and downlink direction, as such, both gNB 10 Tx beam identifier and UE 20 Tx beam identifier are needed. The scenario of no Tx/Rx reciprocity in both gNB 10 and UE 20 typically occurs for transmissions that use the shared channel (e.g., uplink shared channel, and/or downlink shared channel). Specifically, for RACH procedure, the transmissions are RAR transmissions, Msg3 and Msg4 transmissions. In such transmissions, the receiver can assist the transmitter by reporting a suitable Tx beam. Such reporting is also beneficial for beam refinement performed by the transmitter. The beam reporting is used to assist the beam direction of the subsequent transmission. For example, gNB 10 performs beam measurement during RACH preamble receptions for the purpose of identifying the optimal uplink Tx beam. The measurement result is transmitted back to the UE 20 to assist the subsequent transmission from the UE 20 (e.g., Msg3). This same approach can be applied for the downlink direction, in which the UE 20 performs the beam measurement and reports the optimal downlink Tx beam back to the gNB 10.

In accordance with other specific embodiments of the invention, the mapping to the frequency domain may be made on a sub-carrier granularity in which each sub-carrier has different beamforming configurations. The beamforming configurations that are applied to the different sub-carriers may be in a predetermined repeated pattern or, in other embodiments each beamforming configuration is mapped to a block of sub-carriers. For example, in instances in which five (5) beamforming configurations are associated with twenty (20) sub-carrier allocations, in the repeated pattern scenario, first beamforming configuration (F1) uses sub-carriers 1, 6, 11, 16 and 21, second beamforming configuration (F2) uses sub-carriers 2, 7, 12, 17 and 22, etc. While, in the block scenario, first beamforming configuration (F1) uses sub-carriers 1-5, second beamforming configuration (F2) uses sub-carriers 6-10, etc.

In other embodiments of the invention, in which the beamforming is hybrid forming (H-BF), and thus entails analog beamforming (A-BF), synchronization/initial access signaling from the BS (eNB, gNB or the like) may be configured to include beam direction indication information in order to maintain beam alignment between the UE and the BS. In specific embodiments of the invention, beam direction indication information is included in the synchronization/initial access message based on associating the uplink preamble resource blocks to the beam precoding used for each broadcasted signal.

By including beam direction indication information in signaling from the BS, the UE is made aware of the BS mapping between upcoming synchronization/initial access resources, such as RACH resources and BS antenna configurations. In this manner, the UE is able to select to transmit synchronization/initial access messages, such as RACH preamble, on a specific RACH resource when the UE knows that the best possible BS antenna configuration is being used (i.e., when the BS has a beamforming configuration directly facing the UE).

In current random access procedure, the BS allocates RACH frequency and time resources to all UEs within the listening area, which means when the UEs transmit the RACH preamble it is in that specified frequency and time resources allocated by the BS. In accordance with embodiments of the present invention, the BS broadcasts beam index information (i.e., receiving beam configuration of the BS) for the random access resources in addition to the random access frequency and time resources. This information can be conveyed to the UE as part of the broadcasted system information. For example, the BS broadcasts, for Beam Index 1, a first specified frequency and time resources and, for Beam Index 2, a second specified frequency and time resources. In response to receiving such a broadcast, the UE determines which Beam Index is the best and then waits until the frequency and time associated with that Beam index is available for transmitting the RACH preamble.

In accordance with specific embodiments of the invention, inclusion of the beam direction indication information in the synchronization signal or some other initial access signal broadcasted by the BS may be necessary because when the UE transmits the RACH preamble, it is advantageous for the BS to be applying the correct receiving beam configuration.

In addition, the UE benefits from knowing how to obtain the right allocation of RACH resources and the frequency in which the resources are repeated. As such, according to embodiments of the invention, the BS may broadcast the beam direction indication information associated with the RACH frequency and time resources with a specified reference point (e.g., a Single Frame Number (SFN number or the like). In such embodiments of the invention, in which the BS broadcasts the number of different beam directions/antenna configurations, the UE may apply logistics based on the SFN number or the like to align with the repetition pattern of the beam directions/antenna configurations.

Such inclusion of the beam direction indication information in the synchronization signal or some other initial access signal broadcasted by the BS is specifically needed for the analog beamforming portion of the hybrid beamforming. This is because when the analog portion is set to a specified sector of the coverage area in a different direction, the BS does not listen/receive the transmissions because the receiving beam configuration is directed in a different direction. D-BF listens to all transmissions in all directions simultaneously and, thus, the UE does not need to know the beam direction indication information of the BS. The BS broadcasts the synchronization signal or some other initial access signal to different sectors of the cell in different time or frequency slots and, in response, the UE, which has knowledge of when the time of frequency slots occur and their frequency, transmits the initial access/contact preamble when the BS is listening in the UE's sector, (i.e., in the time or frequency slot associated with the sector that the UE currently resides in).

According to further embodiments of the invention, in which only frequency domain multiplexing is used and, thus, beam alignment cannot be assumed, the UE may be configured to transmit the initial access transmissions, such as RACH transmissions in multiple short bursts with each burst using a specified beam direction. In such embodiments of the invention, the BS measures the received power or other quality parameters(s) related to the received signal of each short burst and identifies the relative power or signal quality difference between each short burst. The BS transmits the relative power or signal quality difference information back to the UE and, in response, the UE may adjust the direction of the UL transmission beam. In this regard, the relative power or signal quality difference information allows the UE to predict the best transmit beam for transmitting from the UE to the BS.

In those embodiments of the invention which are limited to frequency domain multiplexing, the UL and the DL beam direction may be, but are not always, different (i.e., less than full beam alignment) depending on the frequency offset. In those instances in which the UL and DL direction are different, adjustment of the UL transmission beam may be desired. Conversely, in the hybrid scenario, in which time domain multiplexing is also applicable, the UE listens to the DL broadcast information and the UE transmits the initial access/contact signal, e.g., RACH preamble, in the direction of the strongest signal. Therefore, there is no need to transmit in alternative directions, especially, in those instances in which the UE antenna array is digital, as the DL broadcast information has a pilot that can be used for the antenna configuration.

In still further embodiments of the invention, in which only frequency domain multiplexing is used, and thus beam alignment cannot be assumed, it is conceivable that a transmission from the UE to the BS is not received by the BS, and thus retransmission of the signal may be required. In accordance with embodiments of the present invention the retransmission of the initial access/contact signals by the UE may provide for changing the beam direction (i.e. a different beam index) as opposed to or in addition to increasing the transmission power.

In other specific embodiments of the invention, beam measurement may be performed by a receiver, either at the BS or UE, and reported back to the transmitter, either a corresponding UE or BS, for the purpose of aiding in the adjustment of the transmitting beam.

A system for frequency domain multi-beam multiplexing in a radio communication network defines embodiments of the invention. The system includes a first transceiver that is configured to (i) distribute a plurality of beams, each beam with a different coverage area, simultaneously to cover a predetermined area, and (ii) precode a plurality of subcarriers in an Orthogonal Frequency-Division Multiplexing (OFDM) modulated signal so that each beam is represented by at least one subcarrier. The system additionally includes a second transceiver configured to (i) receive the OFDM modulated signal, and (ii) transmit at least one contact signal to the first transceiver based on the precoding of the subcarriers in the OFDM modulated signal.

In such embodiments of the system, the first transceiver may be associated with a base station (i.e., eNB, gNB or the like) or a User Equipment (UE)/mobile terminal and the second transceiver may be associated with a UE/mobile terminal.

In specific embodiments of the system, in which the first and second transceiver are in full beam alignment, the second transceiver is further configured to use a corresponding beam direction as a transmitter of the first transceiver for the transmission of the contact signal based on the precoding of the subcarriers in the OFDM modulated signal indicating direction of the transmitter of the first transceiver.

In other specific embodiments of the system, in which the first and second transceiver are in less than full beam alignment, the second transceiver is further configured to transmit the contact signal as a sweep based on the precoding of the subcarriers in the OFDM modulated signal indicating a beam for transmission.

In further specific embodiments of the system, in which the predetermined area covered by the beams is a total coverage area of the first transceiver, the second transceiver may be further configured to transmit the contact signals in a plurality of short burst transmissions, each short burst transmission associated with at least one of subcarriers. In such embodiments of the system, the first transceiver may be further configured to measure a power or other quality parameter(s) related to the received signal of each short burst transmission, identify a relative power or signal quality difference between each short burst transmission and communicate relative power or signal quality difference information to the second transceiver in response to receiving the relative power or signal quality difference information the second transceiver is configured to the adjust transmitter beam configuration in the second transceiver.

In further embodiments of the system, the second transceiver is configured to, in response to the first transceiver failing to receive the contact signal, re-transmit the contact signal using a different beam configuration.

In still further embodiments of the system, in which the predetermined area is less than a total coverage area of the transceiver, the first transceiver is further configured to transmit the OFDM modulated signal that indicates a direction of each of the plurality of beams in reference to available synchronization resources. While in other related embodiments of the system, the first transceiver is further configured to broadcast the OFDM modulated signal that includes a beam identifier associated with the different time or frequency slots.

Thus, systems, devices, methods, computer program products and the like described above provide for frequency domain multi-beam multiplexing. In this regard, a Base Station (BS) is configured to distribute, simultaneously, a plurality of beams across a predetermined coverage area. Each of the beams are associated with an antenna configuration (or precoding of the signals) and a different coverage area. A plurality of sub-carriers are precoded in an OFDM modulated signal for the purpose of shaping (i.e., beamforming) each of the plurality of beams. In this regard, each of the different slots available for an initial access/contact procedure, such as a RACH procedure, which are each associated with a different beamforming configuration in the base station, are mapped to the frequency domain as opposed to or in combination with the time domain. As such, the present invention consumes less time resources by allocating different sub-carriers in the frequency domain and, thus, improves latency introduced by the initial access/contact procedure.

Each network node, (e.g., BS, eNB, AP UE and the like) described herein generally includes circuitry for implementing audio, visual, and/or logic functions. For example, the processor/BS/UE may include a digital signal processor device, a microprocessor device, and various analog-to-digital converters, digital-to-analog converters, and other support circuits. Control and signal processing functions of the system in which the processor resides may be allocated between these devices according to their respective capabilities. The processor/BS/UE may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, computer-implemented process, and/or the like), or as any combination of the foregoing. Accordingly, embodiments of the present invention may take the form of an entirely an entirely software embodiment (including firmware, resident software, micro-code, stored procedures, etc.), an entirely hardware embodiment, or an embodiment combining software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method, for a user equipment (UE), for enabling network access in a radio communication network, the method comprising:
   receiving synchronization signals in one or more of a plurality of beams, to cover a predetermined area, wherein each beam has a polarization or coverage area different from the other beams;
   receiving a network broadcasted signal that maps random access channel (RACH) resources and synchronization signals;
   transmitting an Orthogonal Frequency-Division Multiplexing (OFDM) modulated signal being a RACH preamble signal configured to indicate a direction of any one of the beams in reference to predefined resources, wherein the predefined resources include frequency and time, wherein each of the plurality of beams is represented by a RACH resource comprising the RACH preamble signal; and
   upon failing to receive a RACH response, transmitting the RACH preamble signal using a different beam direction while maintaining a same transmit power.

2. The method of claim 1, wherein the transmitting further comprises mapping each of the RACH resources to one beam of the plurality of beams, wherein each of the RACH resources comprises a pattern repeated over time.

3. The method of claim 1, wherein the transmitting further comprises mapping the RACH resources to one beam of the plurality of beams, wherein the RACH resources further comprises a block of RACH resources comprising a predetermined number of RACH resources.

4. The method of claim 1, wherein the transmitting further comprises transmitting the OFDM modulated signal that includes a beam identifier associated with the corresponding beam.

5. A user equipment including:
   a processor; and
   a transceiver in communication with the processor and configured to:
      transmit an Orthogonal Frequency-Division Multiplexing Signal (OFDM) modulated signal being a random access channel (RACH) preamble signal configured to indicate a direction of any one of a plurality of beams in reference to predefined resources, wherein the predefined resources include frequency and time, wherein each of the plurality of beams is represented by a RACH resource comprising the RACH preamble signal and wherein the plurality of beams are defined to cover a predetermined area, wherein each beam has a polarization or coverage area that is different from the other beams; and
      upon failing to receive a RACH response, transmit the RACH preamble signal using a different beam direction while maintaining a same transmit power.

6. A computer program product for enabling network access in a radio communication network, the computer program product comprising:
   a non-transitory computer-readable medium comprising a set of codes for causing a computer to:
   transmit an Orthogonal Frequency-Division Multiplexing Signal (OFDM) modulated signal being a random access channel (RACH) preamble signal configured to indicate a direction of any one of a plurality of beams in reference to predefined resources, wherein the predefined resources include frequency and time, wherein each of the plurality of beams is represented by a RACH resource comprising the RACH preamble signal and wherein the plurality of beams are defined to cover a predetermined area, such that each beam has a polarization or coverage area that is different from the other beams; and
   upon failing to receive a RACH response, transmit the RACH preamble signal using a different beam direction while maintaining a same transmit power.

7. A method, performed in a base station, for network access in a radio communication network, the method comprising:
   receiving, from a user equipment (UE), control information for use in a network access procedure, wherein the control information is transmitted in an Orthogonal Frequency-Division Multiplexing (OFDM) modulated signal being a RACH preamble signal configured to indicate a direction of any one of a plurality of beams in reference to predefined resources, wherein the predefined resources include frequency and time, wherein each of the plurality of beams is represented by a random access channel (RACH) resource comprising the RACH preamble signal;
   determining a beam direction used for transmitting the received control information based on the RACH resources comprising the control information;
   in response to determining the beam direction, transmitting, to the UE, further control information for use in the network access procedure; and
   in response to the UE failing to receive the further control information, re-transmitting the further control information using a different beam direction while maintaining a same transmit power.

8. The method of claim 7, wherein determining beam direction further comprises determining the beam direction used for transmitting the received control information based on a pre-defined mapping of RACH resources to beam directions for each of the plurality of beams in reference to predefined resources.

9. The method of claim 7, further comprising, prior to receiving the control information, receiving pre-defined mapping of one or more of the RACH resources to a beam direction for each of the plurality of beams.

10. The method of claim 7, further comprising in response to receiving the control information, transmitting, to the network node, further control information for use in the network access procedure, wherein the further control information is transmitted in a same beam direction as the determined beam direction.

11. The method of claim 7, wherein transmitting the further control information further comprises transmitting the further control information in a plurality of short burst transmissions, each short burst transmission associated with the RACH resources within the OFDM modulated signal.

12. The method of claim 11, wherein the network node measures a power of each short burst transmission, identifies a short burst transmission with a strongest power and transmits the beam identity information associated with the identified short burst transmission.

13. The method of claim 12, further comprising receiving, from the UE, the beam identity information and using the beam identity information to select a beam direction for further transmissions.

14. A base station including:
a processor; and
a transceiver in communication with the processor and configured to receive, from a user equipment (UE), control information for use in a network access procedure, wherein the control information is transmitted in an Orthogonal Frequency-Division Multiplexing (OFDM) modulated signal being a random access channel (RACH) preamble signal configured to indicate a direction of any one of a plurality of beams in reference to predefined resources, wherein the predefined resources include frequency and time, wherein each of the plurality of beams is represented by a RACH resource comprising the RACH preamble signal,
wherein the processor is configured to determine a beam direction used for transmitting the received control information based on RACH resources comprising the control information,
wherein the transceiver is further configured to transmit, to the UE, further control information for use in the network access procedure, and
wherein, in response the UE failing to receive the further control information, the transceiver is configured to re-transmit the further control information using a different beam direction while maintaining a same transmit power.

\* \* \* \* \*